May 21, 1929.                A. BENZON                1,713,886
                           WET FEED HOPPER
                         Filed April 30, 1926
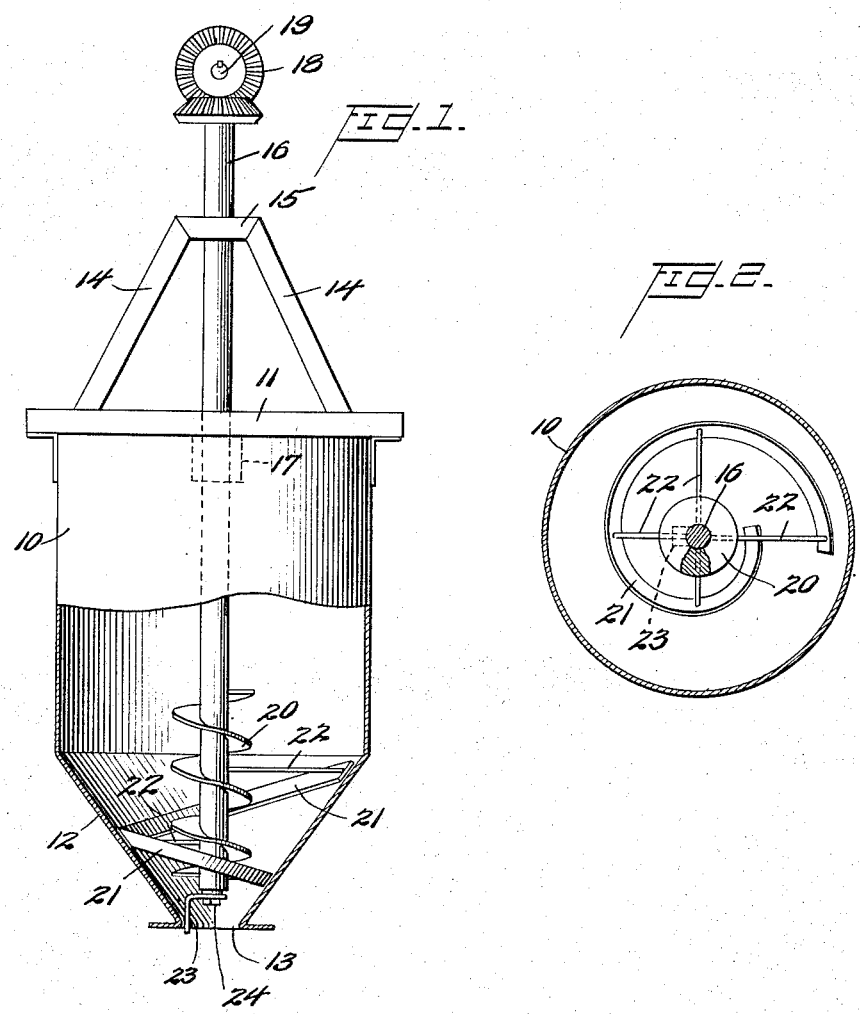

Patented May 21, 1929.

1,713,886

UNITED STATES PATENT OFFICE.

AXEL BENZON, OF CATONSVILLE, MARYLAND, ASSIGNOR TO THE SILICA GEL CORPORATION, OF BALTIMORE, MARYLAND, A CORPORATION OF MARYLAND.

WET-FEED HOPPER.

Application filed April 30, 1926. Serial No. 105,858.

This invention relates to feed mechanisms for hoppers and more particularly to mechanical devices adapted to be installed in hoppers used for containing and delivering pulverized or granular materials having a tendency to stick together, adhere to the hopper walls and bridge the delivery opening of the same.

It is a general object of the present invention to provide a novel and improved form of hopper discharge mechanism.

More particularly it is an object of this invention to provide, in a hopper, a means for continuously breaking the bond between the material and the sloping sides of the hopper.

Another object of the present invention consists in the provision, in a hopper, of a central rotatable agitating conveyor screw moving in such a direction as to continuously agitate the material near the discharge opening of the hopper in a manner most effecting to feed the particular material from the hopper.

A further object of the present invention consists in the provision, in a feed hopper, of a cutter projecting through the delivery opening at the bottom of the hopper and moving so as to keep the same always open.

A still further object of the present invention consists in the provision of a plurality of continuously driven means mounted within a hopper and insuring not only a continuous flow of material therefrom, but a uniform lowering of the level of the material within the hopper.

Other and further objects of the present invention will be more apparent to those skilled in the art after a consideration of the attached drawing and following specification wherein is disclosed a single exemplary embodiment of the invention with the understanding however that modifications may be made therein without departing from the spirit of the invention so long as they fall within the scope of the appended claims.

In said drawings:

Figure 1 is a side elevation partially in vertical section; and

Figure 2 is a horizontal section of a hopper equipped with a device according to the present invention.

When feeding pulverized or granular material from a hopper having an open bottom, it is found that certain of such materials will not flow readily and freely from the hopper when the bottom gate or valve is opened. Other solids in granular form and particularly those that are damp, wet or sticky will not flow at all unless the sides of the hopper are beaten, or the material is caused to flow by agitation or by poking it loose and the flow then will be only spasmodic and will soon stop. It is well known that wet sand, damp pulverized coal, acid phosphate and a large group of similar materials will flow only when assisted and in all cases it is safe to say that the flow will be irregular and the level of the material in the hopper will not sink uniformly. By this last statement is meant that the material adjacent the converging walls of the hopper will cling to the same and only the material in the center will flow. This condition is caused by packing and bridging of the materials over the converging lower end of the hopper. To accomplish continuous steady flow, the material in the hopper must be loosened by some kind of stirrer and the bond between the material and the sides of the hopper must be continuously cut. The present invention accomplishes this in a novel and effective manner.

Referring to the drawings, there is disclosed at 10 the body of a hopper shown as cylindrical in horizontal section, but any other configuration desired may be used. This hopper may or may not be provided with a cover such as shown at 11. The lower end of the hopper is convergent as shown at 12 and is in the form of a truncated circular cone provided with the discharge passage 13 at the lower end.

From the cover, or sides of the body of the hopper near their top, are supported the brackets 14 carrying at their upper end the bearing 15 for the vertical central shaft 16. This shaft may be provided with an additional bearing 17 near the level of the cover 11, either supported from the cover or from a spider secured to the sides of the hopper body. The shaft 16 is adapted to be continuously rotated by any desired mechanical device here shown as a set of bevel gears 18, the driving gear being mounted on a shaft 19 connected to any suitable source of power.

The shaft 16 carries near its lower end three devices to insure a continuous outflow of the material contained in the hopper. The first of these is a conveyor screw or agitator 20 constructed by wrapping a sheet of metal edgewise around the shaft and securing it thereto in any suitable manner. This extends from near the bottom of the shaft to a distance slightly above the junction of the converging bottom with the vertical sides of the hopper and has a fairly steep pitch and a diameter slightly greater than the outlet opening of the hopper, altho the proportions shown are not to be considered limiting in any sense. The second of these devices is a steel band cutter 21 supported by radial arms 22 from the shaft. This cutter is formed helicoidal from a thin sheet of metal and its outer surface substantially contacts with the inner surface of the conical bottom 12 of the hopper. This cutter preferably makes a single turn around the shaft. The third means secured to the shaft is a feed opening cutter 23 in the form of a right angled member having one of its arms secured by the bolt 24 to the end of the shaft 16 which is slightly above the opening 13 and having its other arm depending thru and below the opening 13 and closely adjacent to the edges thereof, as clearly shown in Figure 1.

In operation, the hopper is filled with any of the above mentioned forms of material which it is desired to feed in a continuous and uniform manner and the shaft 16 is continuously driven from any suitable source of power in a direction which is counter clockwise as viewed in Figure 2, i. e., when looking from the top down onto the hopper. The screw agitator 20 being wound in a left hand manner serves to lift the material in the hopper away from the opening. The band cutter is quite thin and passes between the material and the sides of the converging bottom of the hopper and continuously breaks or cuts the bond between this material and the hopper walls so that the material can readily flow down along the sides of the hopper. The conveyor screw does not perform the usual function of a conveyor screw, for it rotates in such a manner as to lift the material upwardly until it reaches the top of the screw and in this manner continuously agitates or stirs the material which passes outwardly and downwardly beyond the sides of the cylinder generated by the edges of the screw and beneath the bottom thereof. The material is prevented from bridging and clogging the discharge passage 13 by means of the cutter 23 and thus there is assured a constant and steady flow of material through the opening 13.

This type of hopper mechanism has been tried out commercially in connection with wet sand, oil soaked, pulverulent material and other granular substances and has been found to operate in a highly satisfactory manner.

Having thus described the invention, what is claimed as new and desired to be secured by Letters Patent is:

1. The combination with a hopper having a conical bottom provided with a central discharge opening, of an axially positioned rotatably mounted shaft in said hopper, a conveyor screw carried thereby near said conical bottom, and a cutter at the end of said shaft extending thru said discharge opening.

2. The combination with a hopper having a conical bottom provided with a central discharge opening of an axially positioned rotatably mounted shaft in said hopper, a helicoidal cutter secured to said shaft and substantially engaging the walls of said conical bottom, and a cutter depending from the end of said shaft thru said discharge opening.

3. The combination with a hopper having a conical bottom provided with a central discharge opening of an axially disposed rotatable shaft in said hopper, a conveyor screw near the lower end of said shaft, a helicoidal cutter secured to said shaft and substantially engaging the walls of said conical bottom, and a cutter carried by the bottom of said shaft and passing thru said discharge opening.

4. The combination with a hopper having a conical bottom provided with a central discharge opening of brackets secured to said hopper, a bearing carried by said brackets, a shaft journalled in said bearing axially of said conical bottom, and extending downwardly near to said discharge opening, an agitator carried by said shaft above said opening, a cutter carried by said shaft and adapted to scrape the surface of said conical bottom, and a second cutter carried by said shaft and passing thru said discharge opening.

5. The combination with a hopper having a conical bottom with a central discharge opening of an axially positioned conveyor screw mounted near said opening, said screw being of larger diameter than said opening, means to rotate said screw in a direction opposite to the feed thereof, and means to prevent clogging of said opening.

In testimony whereof I hereunto affix my signature.

AXEL BENZON.